E. W. STROHN.
VACUUM DRYING APPARATUS.
APPLICATION FILED OCT. 15, 1910.
981,494. Patented Jan. 10, 1911.
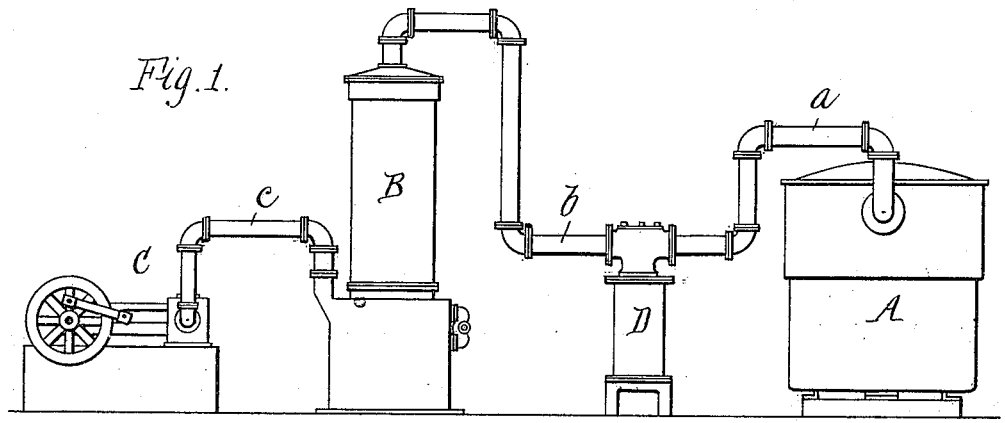
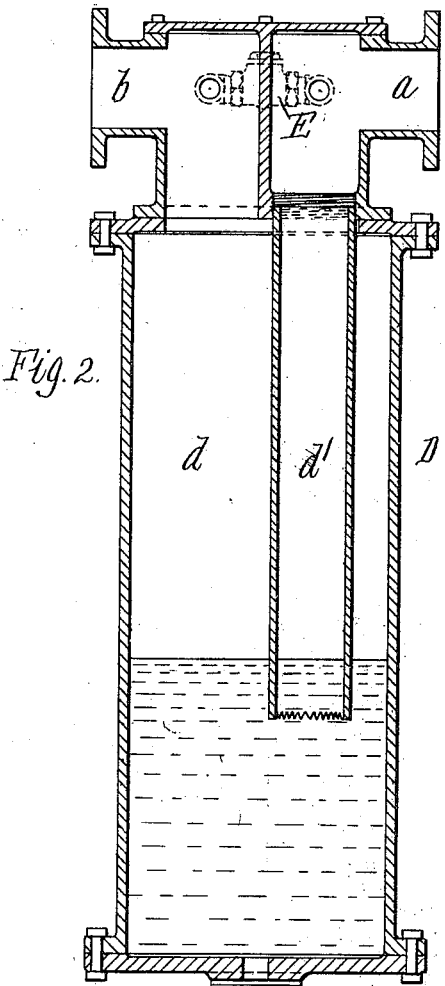
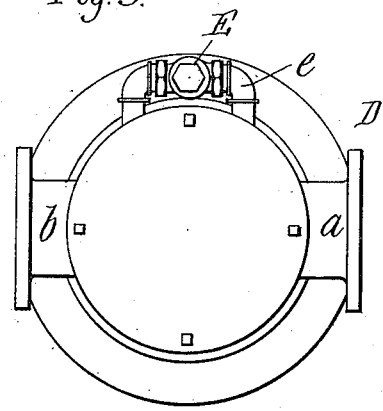
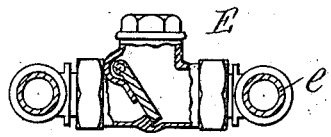

UNITED STATES PATENT OFFICE.

EMIL WILHELM STROHN, OF BUFFALO, NEW YORK, ASSIGNOR TO J. P. DEVINE COMPANY, OF BUFFALO, NEW YORK.

VACUUM DRYING APPARATUS.

981,494.

Specification of Letters Patent.   Patented Jan. 10, 1911.

Application filed October 15, 1910.  Serial No. 587,137.

*To all whom it may concern:*

Be it known that I, EMIL WILHELM STROHN, a subject of the Emperor of Germany, residing at Buffalo, in the county of Erie and State of New York, have invented a new and useful Improvement in Vacuum Drying Apparatus, of which the following is a specification.

This invention relates to vacuum drying apparatus of that sort in which a dust filter is interposed in the exhaust connections between the drying chamber and the condenser, for removing from the air and vapor drawn from the material in the drying chamber any dust or impurities entrained thereby so as to prevent the dust or impurities from reaching the condenser.

The dust filter ordinarily comprises a receptacle containing water or other filtering liquid and provided with an inlet pipe or passage for the air and vapor which connects with the drying chamber and has its discharge end submerged in the filtering liquid so that the air and vapor are compelled to flow through the filtering liquid. It sometimes happens that on the vacuum being broken in the exhaust connections on the exit side of the filter, whether intentionally or accidentally, the filtering liquid is forced by the pressure thus created from the filter through said inlet pipe or passage into the drying chamber and spoils the material contained therein.

The object of this invention is to prevent the filtering liquid from being thus forced into the drying chamber, by providing a pressure-operated valve which acts automatically upon the vacuum being broken in the exhaust connections of the apparatus on the exit, or pump side, of the filter, to increase the pressure in the inlet connection of the filter or equalize the pressure in the inlet and exit connections of the filter. This automatic valve controls a by-pass, which may be a pipe, opening or passage of any suitable kind, connecting the inlet and exit connections of the filter above the filtering liquid. In the normal operation of the apparatus the valve closes said by-pass but it is moved by the pressure in the exit connection of the filter to open the by-pass and place the inlet and exit connections of the filter in communication when the vacuum is broken in the exhaust connections of the apparatus on the exit side of the filter.

In the accompanying drawings: Figure 1 is a diagrammatic view of a vacuum drying apparatus embodying the invention. Fig. 2 is a sectional elevation, on an enlarged scale, of the dust filter. Fig. 3 is a plan view of the filter. Fig. 4 is a section of the automatic valve.

Like reference characters refer to like parts in the several figures.

A represents the drying chamber or evaporating vessel, B the condenser, C the vacuum pump, and D the dust filter of a vacuum drying apparatus. These devices are arranged and connected in the usual way, the dust filter D being located between the drying chamber or evaporating vessel and the condenser. The pump C draws the air and vapor from the drying chamber A through an inlet pipe *a* into the filter D and from the filter through an exit pipe *b* into the upper portion of the condenser B, to the lower portion of which the induction pipe *c* of the pump is connected. The drying chamber or vessel A, the condenser B and the pump C may be of the usual or any suitable construction.

The dust filter comprises, as usual, a receptacle *d* in the lower portion of which the water or other filtering liquid is contained, and a descending pipe or passage *d'*, the lower discharge end of which is submerged in the filtering liquid. The pipe or passage connects at its upper end with and is, in effect, a continuation of the inlet pipe *a* leading from the drying chamber, so that the air and vapor in flowing through the filter from the inlet pipe *a* to the exit pipe *b*, which leads from the upper portion of the filter receptacle *d*, are compelled to pass through the filtering liquid. The air and vapor in leaving the submerged end of the pipe *d'* are broken up and rise through the filtering liquid in the form of bubbles, whereby the dust and impurities are separated from the vapor. The filter may, however, be of any other suitable construction provided with a pipe or passage for the air and vapor which has a portion submerged so as to compel the air and vapor to flow through the filtering liquid.

The automatic valve E, in the construction illustrated, is a swing valve arranged in a by-pass pipe $e$ which is located outside of the filter receptacle and joins the inlet and exit connections $a$ and $b$ of the filter. The location of the by-pass pipe outside of the filter receptacle affords ready access to the automatic valve. The by-pass can, however, be a pipe, passage or opening of any suitable kind arranged in any suitable way to provide a passage around the filtering liquid between the inlet and the exit connections of the filter, or between the exhaust connections of the apparatus at the inlet and exit sides of the filter, and any suitable type of valve can be employed.

In the normal operation of the apparatus the valve E is held to its seat by gravity and closes the by-pass. If the vacuum is broken in the suction connections of the apparatus at the exit side of the filter so as to create a greater pressure in the exit connection of the filter than in the inlet connection thereof, the pressure, acting on the valve E, will open it and connect the inlet and exit connections of the filter through the by-pass $e$, thereby equalizing the pressure in the exhaust connections of the apparatus at the inlet and exit sides of the filter and preventing the filtering liquid from being forced through the inlet pipe $a$ into the drying chamber.

I claim as my invention:

1. In a vacuum drying apparatus, the combination with a drying chamber, and a filter having a vapor inlet connection leading from the drying chamber and a vapor exit connection and containing filtering liquid through which the vapor is drawn from the drying chamber, of a by-pass between said inlet and exit connections, and a valve which normally closes said by-pass and operates automatically to open the by-pass upon the vacuum being broken in said exit connection, substantially as set forth.

2. In a vacuum drying apparatus, the combination with a drying chamber, and a filter having a vapor inlet connection leading from the drying chamber and a vapor exit connection and containing filtering liquid through which the vapor is drawn from the drying chamber, of a by-pass between said inlet and exit connections, and a valve which normally closes said by-pass and is operated by the pressure in said exit connection to open the by-pass upon the vacuum being broken in said exit connection, substantially as set forth.

3. In a vacuum drying apparatus, the combination with a drying chamber, and a filter having a vapor inlet connection leading from the drying chamber and a vapor exit connection and containing filtering liquid through which the vapor is drawn from the drying chamber, of a by-pass between said inlet and exit connections, and a freely movable valve which normally closes said by-pass and opens in a direction toward the inlet connection of the filter whereby the valve is automatically opened and connects the inlet and exit connections of the filter by the pressure in said exit connection upon the vacuum being broken in said exit connection, substantially as set forth.

4. In a vacuum drying apparatus, the combination with a drying chamber, and a filter having a vapor inlet connection leading from the drying chamber and a vapor exit connection and containing filtering liquid through which the vapor is drawn from the drying chamber, of a by-pass between said inlet and exit connections which is located outside of the filter receptacle, and a valve which normally closes said by-pass and is operated by the pressure in said exit connection to open the by-pass upon the vacuum being broken in said exit connection, substantially as set forth.

5. In a vacuum drying apparatus, the combination with a drying chamber, and a filter having a vapor inlet connection leading from the drying chamber and a vapor exit connection and containing filtering liquid through which the vapor is drawn from the drying chamber, of a by-pass between said inlet and exit connections, and a gravity seating valve which normally closes said by-pass and which opens in a direction toward the inlet connection of the filter and is operated by the pressure in said exit connection to open the by-pass upon the vacuum being broken in said exit connection, substantially as set forth.

Witness my hand, this 27th day of September, 1910.

EMIL WILHELM STROHN.

Witnesses:
JANETTE O. DUQUETTE,
EDWIN S. WEBSTER.